United States Patent [19]

Rust et al.

[11] Patent Number: 5,263,083
[45] Date of Patent: Nov. 16, 1993

[54] METHOD AND APPARATUS FOR SHARING SPEAKERPHONE PROCESSOR AMONG MULTIPLE USERS

[75] Inventors: Tracy Rust, Austin; Gordon Ford, Round Rock; Cathy Arledge; Tim Wilson, both of Austin, all of Tex.; Ygal Arbel, Sunnyvale, Calif.; Mike Kounnas, Austin, Tex.

[73] Assignee: ROLM Company

[21] Appl. No.: 624,830

[22] Filed: Dec. 10, 1990

[51] Int. Cl.⁵ .................. H04M 1/00; H04M 3/00; H04B 3/20; H04L 5/16
[52] U.S. Cl. .................................. 379/157; 370/31; 379/165; 379/242; 379/388
[58] Field of Search .............. 379/202, 206, 157, 158, 379/165, 242, 388; 370/31

[56] References Cited

U.S. PATENT DOCUMENTS

| | | | |
|---|---|---|---|
| 3,755,625 | 8/1973 | Maston | 379/206 |
| 4,449,238 | 5/1984 | Lee et al. | 379/206 |
| 4,771,417 | 9/1988 | Maxwell et al. | 370/31 |
| 4,912,758 | 3/1990 | Arbel | 379/388 |
| 4,949,335 | 8/1990 | Moore | 370/31 |

FOREIGN PATENT DOCUMENTS

| | | | |
|---|---|---|---|
| 0239093 | 9/1987 | Japan | 370/31 |
| 0060298 | 2/1990 | Japan | 379/157 |

Primary Examiner—James L. Dwyer
Assistant Examiner—Harry S. Hong

[57] ABSTRACT

A communication system includes a number of terminals which communicate through a centralized switch of the system and a lesser number of speech processing circuits which are located remotely from the terminals and which allow full-duplex speakerphone capability to be available to each of the terminals of the system on a shared basis.

11 Claims, 2 Drawing Sheets

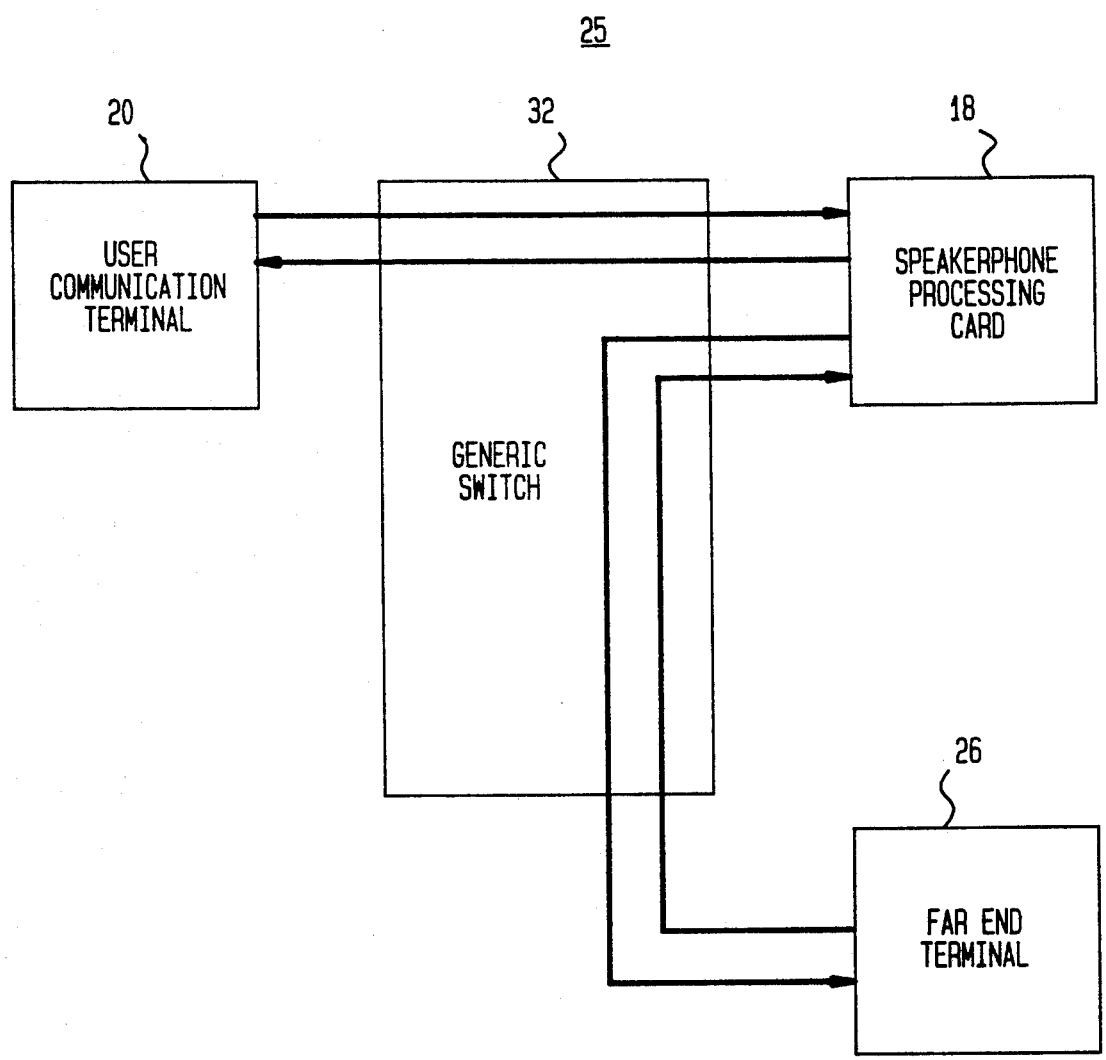

METHOD AND APPARATUS FOR SHARING SPEAKERPHONE PROCESSOR AMONG MULTIPLE USERS

FIELD OF THE INVENTION

This invention relates generally to processing of communication signals to permit the signals to be used in a speakerphone mode, and more particularly, to processing of such signals on a shared basis, with centralized processors located remotely from terminals which are being serviced by the processors.

BACKGROUND OF THE INVENTION

Telephone communication systems are continually developed to provide ever increasing convenience for users. In voice communication, users seek telephone equipment which provides effective "transparency", that is to say that the user of a telephone wishes to communicate with his or her counterpart in a manner that allows each person to become unaware of the telephone. An ideal voice-user telephone device should be able to transmit voice communication between two or more parties without either of the parties being encumbered with a need to hold a telephone instrument. Speakerphones provide this transparency, but at a cost which is prohibitive to many potential users.

A speakerphone in its simplest configuration can consist of a conventional handset with an ear to mouth arrangement and an additional microphone and speaker which permit a user to speak and hear at a distance of at least a few feet from the speakerphone set. Unfortunately, this simple speakerphone configuration, while relatively inexpensive, does not in may instances provide satisfactory results because of echoes which are created in speech by sound reflections from walls of rooms and offices. These echoes form in the speech created within the room by a user of the speakerphone and also in the speech transmitted to the room by the speakerphone. Left uncontrolled, these echoes make speakerphone communication virtually unintelligible.

The control of echoes has been accomplished in various ways in the prior art. The most common form of echo control is attained by operating the speakerphone in a half-duplex mode. In this technique, a sound-actuated switch is used to control transmission over the speakerphone to a single direction at any time, thus preventing a speaking party's echoes from being retransmitted to that party. Control circuitry needed to achieve this half-duplex form of operation adds substantially to the cost of a speakerphone and in large measure is responsible for the fact that speakerphones are not in universal use in residences and businesses in spite of their desirability.

However, even in circumstances where half-duplex speakerphones can be cost justified, there remains in these units a rather undesirable lack of realism to the conversations which take place. If, while using a half-duplex speakerphone mode, a first party is speaking to a second party who starts to speak simultaneously, the words of the second party are not heard by the first party. Also, if background noise exists at the speakerphone location, the second party may not be heard at all because the control circuitry, which is usually sound actuated, may cause the half-duplex system to remain switched in the transmit mode.

These problems associated with half-duplex operation are correctable with control circuitry such as that described in U.S. Pat. No. 4,912,758 (Ygal Arbel). Through echo cancellation techniques, a speakerphone can be made to operate in a full-duplex mode. But in this mode the control circuitry is very expensive and speakerphones of the full-duplex type have been heretofore typically used only in elaborate conference room settings.

It is desirable to have speakerphone capability with half or full-duplex mode without the present high cost.

SUMMARY OF THE INVENTION

The present invention is directed to a communication system and a method of operating same. The system comprises a central processing unit with communication terminals coupled thereto, and a speakerphone processor which facilitates a speakerphone mode of operation at one or more of the terminals as a function of requests from a user of a terminal for such capability at that terminal. The processing means are separated (remotely located) from the terminals and may be employed to provide speakerphone mode signals for any of said terminals on a shared basis.

In a preferred embodiment the processing of the signals involves the achievement of echo cancellation that permits a terminal to operate as a speakerphone in a full-duplex mode. The processing means is a speakerphone processor accessible through a centralized telephone switching unit and is engageable upon signalling from any terminal having access to said switching unit. The speakerphone processor is capable of processing signals emanating from and directed to any of the terminals having access to the switching unit.

Viewed from one aspect the present invention is directed to a communication system. The communication comprises a plurality of communication terminals, one or more processing means, and selecting means. The one or more processing means, which are remote from and shared by said terminals, process communication signals generated by said terminals to facilitate a speakerphone mode of transmission and reception of said signals. The number of terminals in the system exceeds the number of processing means. The selecting means, which is selectable by users of said terminals, connects the terminals with the processing means.

Viewed from another aspect, the present invention is directed to a speakerphone processor for facilitating a speakerphone mode of operation of a communication terminal. The speakerphone processor comprises means for processing communication signals generated by and directed to a communication terminal coupled to said processor so as to facilitate a speakerphone mode of transmission and/or reception of said signals. The speakerphone processor is adapted to cause the processing means to be shared among a plurality of communication terminals.

Viewed from a still another aspect, the present invention is directed to method of communicating between first and second communication terminals, with the first terminal having a speakerphone microphone and speaker set. The method comprises the steps of: establishing a signal path between the first communication terminal and a speakerphone processor, said speakerphone processor being located remotely from the first terminal and shareable with other communication terminals; conveying message signals generated by the first terminal along said path to said speakerphone processor; receiving and processing said signals by the speakerphone processor to facilitate a speakerphone mode of operation of the first terminal; and transmitting, to and from the first communication terminal, the signals which have been so processed such that during communication between the first and second communication terminals, the first communication terminal has speakerphone capability.

The invention will be better understood from the following more detailed description taken in consideration with the accompanying drawings and claims.

BRIEF DESCRIPTION OF THE DRAWINGS

FIG. 2 is a block diagram of another speakerphone system in accordance with the invention.

DETAILED DESCRIPTION

Figure 1:
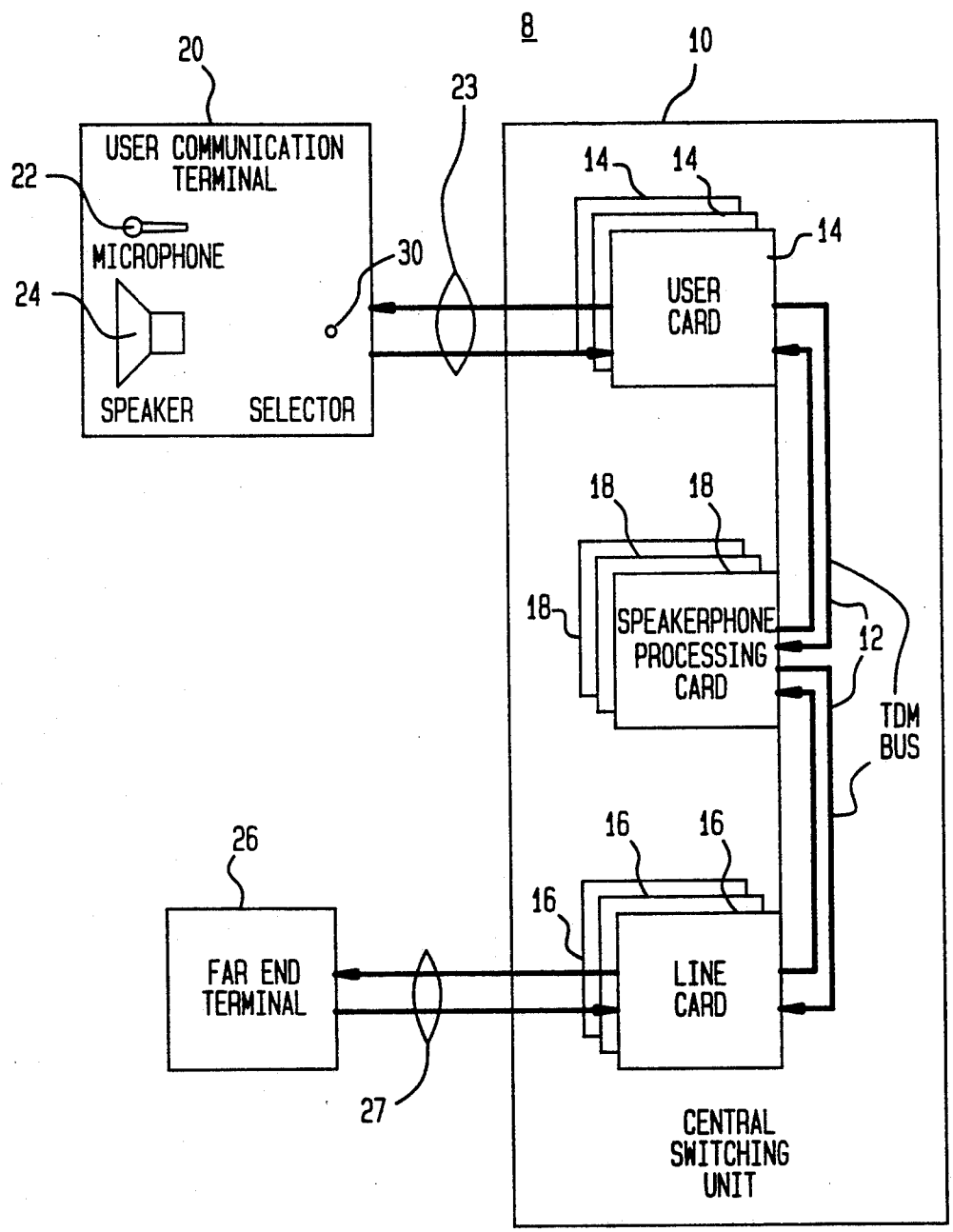
FIG. 1 is a block diagram of a speakerphone system in accordance with the invention.

Referring now to FIG. 1, there is shown a block diagram of a speakerphone system 8 in accordance with the present invention. Speakerphone system 8 comprises a central switching unit 10, a plurality of first user communication terminals 20 (only one of which is shown) and a plurality of second user communication terminals 26 (also designated as a far-end terminal with only one being shown). The central switching unit 10 comprises a time-division multiplexer (TDM) bus 12, one or more interface multiplexer cards 14 (hereinafter referred to as a user card 14) one or more interface line cards 16 (hereinafter referred to as a line card 16) and one or more speakerphone processing cards 18 which perform speakerphone control functions. In some applications the user cards 14 and the line cards 16 are essentially the same. Typically such central switching units 10 are found on the premises of a business establishment having twenty-five of more terminal users. The central switching units 10 are at times referred to in the art as private business exchanges (PBX) or computerized business exchanges (CBX). Typically a CBX is located in a building in which at least some of the terminals are telephone sets.

The user communication terminal 20 comprises a speakerphone microphone 22 a speaker 24 and a speakerphone function selector 30. Microphone 22 and speaker 24 are designed to allow a person to be several feet from terminal 20 and still be able to use terminal 20. Terminal 20 also includes a conventional telephone handset (not shown) which is held to a user's head during use and a plurality of push- buttons (not shown) to enter a telephone number of another terminal. The communication terminal 20 is coupled to the user card 14 through a communication link 23. The detailed operating mechanism of the communication link 23 and the user card 14 can be understood by referring to U.S. Pat. No. 4,642,805 (Gregory P. Dumas, et al.) which is incorporated herein by reference. The far-end terminal 26 may be a conventional telephone or it may be a terminal of the same type as the user communication terminal 20. The speakerphone processing cards 18 are coupled to the user cards 14 and to the line cards 16 via the time division multiplexer bus 12.

The line card 16 is connectable to the far end terminal 26 through a far end communication link 27, which may have various configurations depending upon the physical location of the far end terminal 26.

In operation, a user of the user communication terminal 20 may elect whether or not to employ said terminal in a speakerphone mode. A speakerphone election is achieved by setting up the communication link 23 between the terminal 20 and the central switching unit 10 by, for example, dialing (entering) the identification (telephone) number of the terminal 26, and then by engaging the speakerphone function selector 30 which is adapted to send signals to the user card 14 to set up a path along the TDM bus 12 to the speakerphone processing card 18 and to the line card 16. A terminal which does not have one of the selectors 30 ca also operate within the communication system 8 with the provision of a conventional coding scheme within the central switching unit 10 that permits a user to select speakerphone functioning by dialing (entering) a selection signal (e.g., a one or more digit code number). The line card 16 connects to the far-end communication terminal 26 in a conventional manner whether or not the speakerphone mode of communication has been elected by the user of the terminal 20.

After the above-described links are established in the central switching unit 10, a user of the terminal 20 may employ the microphone 22 and the speaker 24 to communicate with a user of the far-end terminal 26.

The central switching unit 10 is capable of rapidly changing the connection between any of the user communication terminals 20 and various internal elements of the central switching unit 10. The number of user communication terminals 20 which are connectable to the central switching unit 10 may substantially exceed the number of the number of speakerphone processing cards 18 because the speakerphone processing cards 18 may be used on a shared basis by the communication terminals 20. Thus in this inventive configuration, the user communication terminals 20 may consist of low cost units containing n control circuitry dedicated to speakerphone operation. These low cost units may not even contain one of the selectors 30.

Because the required speakerphone control circuitry is incorporated on the speakerphone processing cards 18, cost of the processing circuitry is distributed over a great many terminals 20. The speakerphone system 8 brings two advantages to users of the central switching unit 10. First, any of the communication terminals which are equipped with the speakerphone microphones 22 and speakers 24 can be operated in a speakerphone mode. Second, the speakerphone processing cards 18 can be provided with sophisticated echo cancellation capability so that the terminals 20 can be operated in the very desirable full-duplex mode. Full-duplex speakerphone operation has heretofore been reserved for specialized conference room situations because the cost of providing the requisite specialized controls and echo cancellations has precluded more universal application.

In a preferred embodiment, the speakerphone processing cards 18 are structured to operate in accordance with the techniques and principles described in U.S. Pat. No. 4,912,758 (Ygal Arbel) which is incorporated herein by reference.

Because the number of speakerphone processing cards 18 is less than the number of user communication terminals 20 which are serviceable by said cards, there is a statistical possibility that, in a particular telephone system, the user demand for full duplex speakerphone capability may exceed the capacity at some given moment in time. When this condition occurs, the terminal 20, which is exposed to unavailability of full-duplex speakerphone service is switched automatically to half-duplex operation on a back-up basis.

In the event that all of the primary and back-up speakerphone processing capacity is engaged when a user of one of the terminals 20 seeks speakerphone service, then an audible tone is transmitted to the terminal 20 from the central switching unit 10 and the terminal 20 remains in a conventional telephone mode of operation in which a handset is used.

It is to be noted that terminal 26 can be essentially identical to terminal 20 as user card 14 can be essentially identical to line card 16. This is often the case where terminals 20 and 26 are in a common building served by a CBX 10. In such application terminal 26 has the same speakerphone capability as terminal 20.

Referring now to FIG. 2, there is shown a speakerphone system 25 in accordance with the present invention. Speakerphone system 25 comprises a generic switch 32, various first user communication terminals 20 (only one of which is shown), one or more speakerphone processing cards 18 (only one of which is shown) located remotely from the generic switch 32 and various second communication terminals 26 (also designated as far-end terminals with only one being shown). The generic switch may be a conventional PBX, CBX, or even a central office switch of a local telephone operating company. In operation, the user communication terminal 20 gains access to the far-end terminal 26 by the use of a conventional dialing system of the generic switch 32. The terminal 20 gains access to the speakerphone processing card 18 through a conventional conferencing circuit (not shown) in the generic switch 32. Such conferencing circuits typically create interconnections between three or more parties upon receipt of a coded signal from the terminal 20. Accordingly, in an illustrative embodiment, a user of terminal 20 dials the telephone number of the terminal 26 and then dials in one or more additional numbers or symbols and is thus able to communicate with the terminal 26 and has speakerphone capability on the terminal 20.

It is also possible to practice the present invention by using only conventional dialing features of the generic switch 32. In this case, the speakerphone processing card 18 is provided with a conventional call-processor (not shown). A user of the terminal 20, in this embodiment, dials the telephone number of the card 18 and instructs, via providing the telephone number of the terminal 26, the card 18 to set up a connection between the card 18, the terminal 20 and the far-end terminal 26. The connection between the speakerphone processing card 18 and the far-end terminal 26 may be made through the same generic switch 32 or it may also involve other switches, depending on where in the world-wide telephone network the far-end terminal 26 is located. After the user communication terminal 20 and the far-end terminal 26 are interconnected, a user of the terminal 20 may begin communicating in a speakerphone mode to a user of the far-end terminal 26.

As is the case with the speakerphone system 8 shown in FIG. 1, the speakerphone system 25 is equipped with processing capability that permits full-duplex speakerphone operation with a half-duplex back-up capability that automatically engages when all of the full-duplex capacity is in use by various sharing users of the terminals 20.

It is to be understood that the specific design described as an exemplary embodiment is merely illustrative of the spirit and scope of the invention. Modification can be made in the specific design consistent with the principles of the invention. For example, although the invention has been described in terms of its primary applicability to speakerphone processing to achieve full-duplex operation, it will have application to other forms of speakerphone equipment Still further, in an alternate embodiment of the invention, the speakerphone processing card 18 may be provided with half-duplex processing capability as its sole form of functionality. This solely half-duplex form of speakerphone systems is more economical than full-duplex speakerphone systems.

What is claimed is:

1. A communication system comprising:
   a plurality of communication terminals;
   one or more processing means, separated from and shared by said terminals, for processing communication signals generated by said terminals to facilitate a full duplex speakerphone mode of transmission and reception of said signals, the number of terminals in the system exceeding the number of processing means;
   means, selectable by users of the terminals, for connecting the terminals with the processing means;
   the means for connecting comprising twisted pairs of wires and a downlink circuit coupled to each of the twisted pairs of wires, the downlink circuit being adapted to transmit voice and data signals; and
   wherein the one or more speakerphone processors are capable of processing speakerphone communication in a half-duplex mode on a back-up basis when the duplex capacity of the one or more speakerphone processors is fully utilized.

2. The communication system of claim 1 wherein the speakerphone processor is capable of processing speakerphone communication in a half-duplex mode.

3. The communication system of claim 1 wherein the downlink circuit comprises:
   control means for receiving and transmitting control signals for the terminals;
   timing means, syncrhonized with messages carried by the twisted pair of wires for coupling one field of voice data from the messages to the terminals and another field of control data to the control means;
   logic means coupled to the control means for examining the messages and for determining when a newly completed message has been transmitted to the downlink circuit means, the control means being activated to take action based upon the new message;
   means for detecting an error in the transmission of the messages; and
   circuit means for reusing the previously transmitted voice data when the error is detected and also for providing a retransmit signal to provide a retransmission to resynchronize the timing means.

4. A telephone central switching unit comprising:
   one or more means for processing communication signals from and/or to one or more terminals coupled to the switching unit so as to facilitate a full duplex speakerphone mode of transmission and/or reception of said signals;
   said switching unit being adapted such that one of the processing means is selected when it receives a selection signal from a terminal coupled to the switching unit;
   the number of processing means being less than the number of communication terminals connectable thereto;

means for interconnecting the communications terminal with the switching unit, said means for interconnecting includes twisted pairs of wires and a downlink circuit coupled to each of the pairs of wires, the downlink circuit being adapted to transmit voice and data signals; and wherein the one or more speakerphone processors are capable of processing speakerphone communication in a half-duplex mode on a back-up basis when the full duplex capacity of the one or more speakerphone processors is fully utilized.

5. The telephone central switching unit of claim 4 wherein the speakerphone processor is capable of processing speakerphone communication in a half-duplex mode.

6. The telephone central switching unit of claim 4 wherein the downlink circuit comprises:

control means for receiving and transmitting control signals for the terminals;

timing means, synchronized with messages carried by the twisted pair of wires for coupling one field of voice data from the messages to the terminals and another field of control data to the control means;

logic means coupled to the control means for examining the messages and for determining when a newly completed message has been transmitted to the downlink circuit means, the control means being activated to take action based upon the new message;

means for detecting an error in the transmission of the messages; and circuit means for reusing the previously transmitted voice data when the error is detected and also for providing a retransmit signal to provide a retransmission to resynchronize the timing means.

7. A speakerphone processor for facilitating a full duplex speakerphone mode of operation of a communication terminal, said speakerphone processor comprising means for processing communication signals generated by and directed to a communication terminal coupled to said processor so as to facilitate a speakerphone mode of transmission, reception, or transmission and reception of said signals, said means being remote from and being adapted to be shareable with a plurality of said terminals through use of a communication link which includes twisted pairs of wires and a downlink circuit coupled to each of the pairs of wires, the downlink circuit being adapted to transmit voice and data signals; and wherein the speakerphone processor is capable of processing speakerphone communication in a half-duplex mode on a back-up basis when the full duplex capacity of the speakerphone processor is fully utilized.

8. The speakerphone processor of claim 7 further comprising means for dialing a connection with another communication terminal in order to create a communication link between the two communication terminals over which link the processed communication signals pass.

9. The speakerphone processor of claim 7 wherein the speakerphone signal is processed in a half-duplex mode.

10. The speakerphone processor of claim 7 wherein the downlink circuit comprises:

control means for receiving and transmitting control signals for the terminals;

timing means, synchronized with messages carried by the twisted pair of wires for coupling one field of voice data from the messages to the terminals and another field of control data to the control means;

logic means coupled to the control means for examining the messages and for determining when a newly completed message has been transmitted to the downlink circuit means, the control means being activated to take action based upon the new message;

means for detecting an error in the transmission of the messages; and circuit means for reusing the previously transmitted voice data when the error is detected and also for providing a retransmit signal to provide a retransmission to resynchronize the timing means.

11. A method of communicating between first and second communication terminals, with the first terminal having a speakerphone microphone and speaker set, comprising the steps of:

establishing a signal path between the first communication terminal and a speakerphone processor, said speakerphone processor being located remotely from the first terminal and shareable with other communication terminals;

conveying message signals generated by the first terminal along said path to said speakerphone processor;

receiving and processing said signals by the speakerphone processor to facilitate a full duplex speakerphone mode of operation of the first terminal;

transmitting, to and from the first communication terminal, the signals which have been so processed such that during communication between the first and second communication terminals, the first communication terminal has full duplex speakerphone capability; and wherein said speakerphone processor is capable of processing speakerphone communication in a half-duplex mode on a back-up basis when the full duplex capacity of the speakerphone processor is fully utilized.

* * * * *